(12) United States Patent
Shutts et al.

(10) Patent No.: US 6,526,661 B1
(45) Date of Patent: Mar. 4, 2003

(54) CUTTING AND STRIPPING TOOL

(75) Inventors: Leslie B. Shutts, Ruther Glen, VA (US); Yin Ho Cheng, Taipei Hsien (TW); Huang De Sei, Taipei Hsien (TW)

(73) Assignee: Connectool Inc., Ashland, VA (US)

( * ) Notice: Subject to any disclaimer, the term of this patent is extended or adjusted under 35 U.S.C. 154(b) by 11 days.

(21) Appl. No.: 09/935,732

(22) Filed: Aug. 24, 2001

(51) Int. Cl.[7] .................................................. H02G 1/12
(52) U.S. Cl. ............................ 30/90.1; 30/91.2; 81/9.44
(58) Field of Search ................................ 30/90.1, 90.2, 30/91.2; 81/9.4, 9.44

(56) References Cited

U.S. PATENT DOCUMENTS 4,108,028 A * 8/1978 Perrino ........................ 30/90.1
4,958,433 A * 9/1990 Perrson ........................ 30/91.2
5,295,421 A * 3/1994 Mansfield ....................... 81/9.4
6,138,362 A * 10/2000 Yoshimori ................... 30/90.1

OTHER PUBLICATIONS

Paladin Tools connectool Complete Catalog 98, 1998, USA.

* cited by examiner

Primary Examiner—Hwei-Siu Payer
(74) Attorney, Agent, or Firm—Lawrence E. Laubscher, Sr.

(57) ABSTRACT

A versatile hand-held scissors-type cutting and stripping tool includes a pair of pivotally connected handle members, a cutting and stripping blade carried by one of the handle members for cutting flat and round insulated conductors, and for stripping insulation from round insulated conductors, and a pair of flat stripping blades for stripping the outer insulation layer from a flat thin multi-conductor cable.

7 Claims, 3 Drawing Sheets

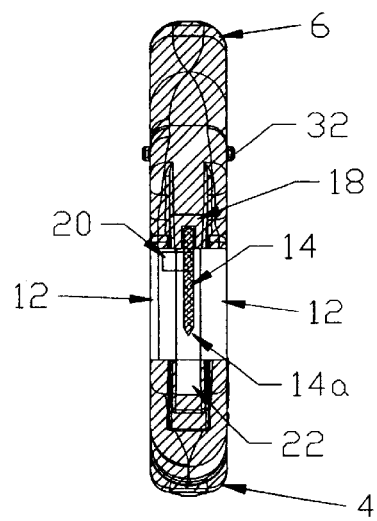
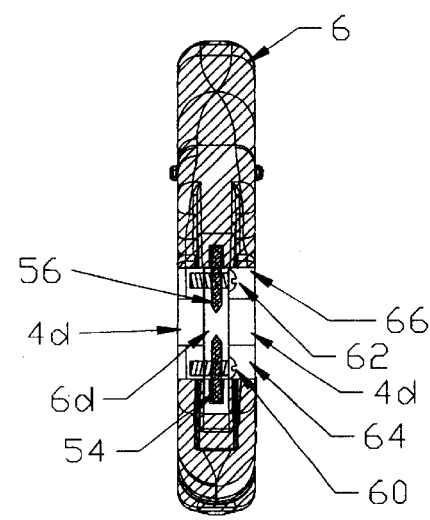
Figure 5          Figure 6
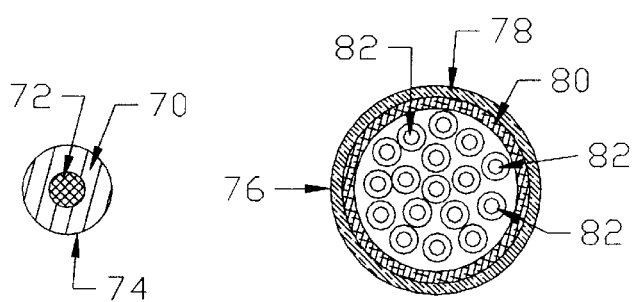
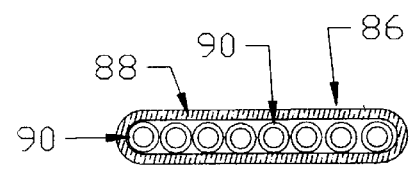
Figure 7      Figure 8      Figure 9

CUTTING AND STRIPPING TOOL

FIELD OF THE INVENTION

A versatile hand-held scissors-type cutting and stripping tool includes a pair of pivotally connected handle members, a pair of stripping blades for stripping the outer insulation layer from a thin flat multi-conductor cable, and an adjustable cutting and stripping blade mounted on one handle member for at least partially cutting a flat or round insulated conductor inserted within a cutting recess contained in the other handle member, and for scoring and stripping a round conductor or cable inserted in a stripping bore also contained within said other handle member.

BACKGROUND OF THE INVENTION

Brief Description of the Prior Art

Stripping tools are well known in the prior art for stripping the insulation from round insulated cables or conductors. In such tools, a stripping blade is adjusted to a desired depth relative to an opening in the tool that receives the round insulated conductor, whereupon the tool is rotated to slice through the insulation layer. The tool is then axially displaced relative to the insulated conductor, thereby to strip the severed insulation layer from the conductor.

Similarly, scissors-type handle-operated cutting devices are known in the art for completely severing a desired length from an insulated conductor.

Normally, a cable-installing technician is provided with a kit containing a large number of tools required for performing the various cutting and insulation-stripping functions required for insulated cables and conductors of various types, shapes, and sizes.

For many years, CONNECTOOL INC., the assignee of the present invention, has marketed the AM12 cutting and stripping tool, which is an adjustable cable cutter and stripper for round cables, VTP/STP telephone and data cables, and other flexible cables. A single stripping and cutting blade is adjustable for different insulation thicknesses, thereby to prevent damage of the shielding layer and the conductors during the scoring and stripping of the outer insulation layer.

The tool of the present invention was developed to provide a single versatile tool that fulfils many needs of the technician in the field, including the stripping of insulation from thin flat multi-conductor cables.

SUMMARY OF THE INVENTION

Accordingly, a primary object of the present invention is to provide an improved hand-held scissors-type cutting and stripping tool that includes a pair of precision stripping blades for stripping insulation from thin flat multi-conductor cables, a single blade that is operable to cut flat and round insulated conductors, and to strip the outer insulation layer from round conductors and cables.

A more specific object of the invention is to provide a hand-operated scissors-type tool including a pair of pivotally connected handle members, a first one of which carries a cutting recess for receiving a flat or round insulated conductor or cable that is to be cut, and a through bore for receiving a round cable or conductor from which the insulation layer is to be stripped, the other handle member carrying a single adjustable depth blade for cutting or stripping the insulated cable or conductor, as desired. The two handle members also carry a pair of precision stripping blades for stripping the insulation from a flat thin multi-conductor insulated cable.

A further object of the invention is to provide a versatile hand-operated scissors-type cable and wire cutter and stripper for use in the preparation of cables and wire for electrical, data and networking communications, telephone communications, broadcast communications, and industrial wiring applications. The tool is capable of cutting and stripping round wires and cable with a minimum diameter of 0.07 inches (1.75 mm) and a maximum diameter of 0.50 inches (12.7 mm), and flat satin telephone cables with a maximum of 10 conductors. Furthermore, the tool is operable to cut and strip 4-pair data networking cable, 25-pair data and telephone cable, 4-conductor, 6-conductor, 8-conductor, and 10-conductor flat satin telephone cable, multi-conductor control cable, and standard electrical hook-up wire between the wire sizes of 14 AWG (2.5 mm$^2$ DIN) and 1 AWG-1/0 (50 mm$^2$ DIN).

According to another object of the invention, the tool contains an adjustable blade depth setting wheel that allows the user to set the cutting and stripping blade depth at a level that ensures round cable and wires can be stripped of the outer insulating jacket without scoring the inner wires, conductors, or shielding. The flat satin stripper means includes two blades that have a precision-calibrated, pre-set cutting depth that ensures the inner wires and conductors of the cable are not scored during a stripping operation. The cutting section is capable of providing a slicing-action, thereby to cut through wire and cable in a manner to prevent deformation of shape. The tool contains a self-regulating closure control spring system that prevents the tool from opening or closing too far causing inadequate stripping or scoring respectively. The tool is comprised of nylon reinforced plastic frame for long life, shock resistance, and durability. The cutting and stripping blades are formed from stainless steel for long life, corrosion resistance, and long-term sharpness.

BRIEF DESCRIPTION OF THE DRAWINGS

Other objects and advantages of the invention will become apparent from a study of the following is specification when viewed in the light of the accompanying drawings, in which:

FIGS. 5 and 6 are sectional views taken along lines 5—5 and 6—6 of FIG. 1, respectively; and FIGS. 7–9 are sectional views of the round insulated conductor, round insulated cable, and flat insulated cable, respectively, that are stripped and fully or partly cut by the cutting and stripping tool of the present invention.

DETAILED DESCRIPTION

Figures 1, 2:
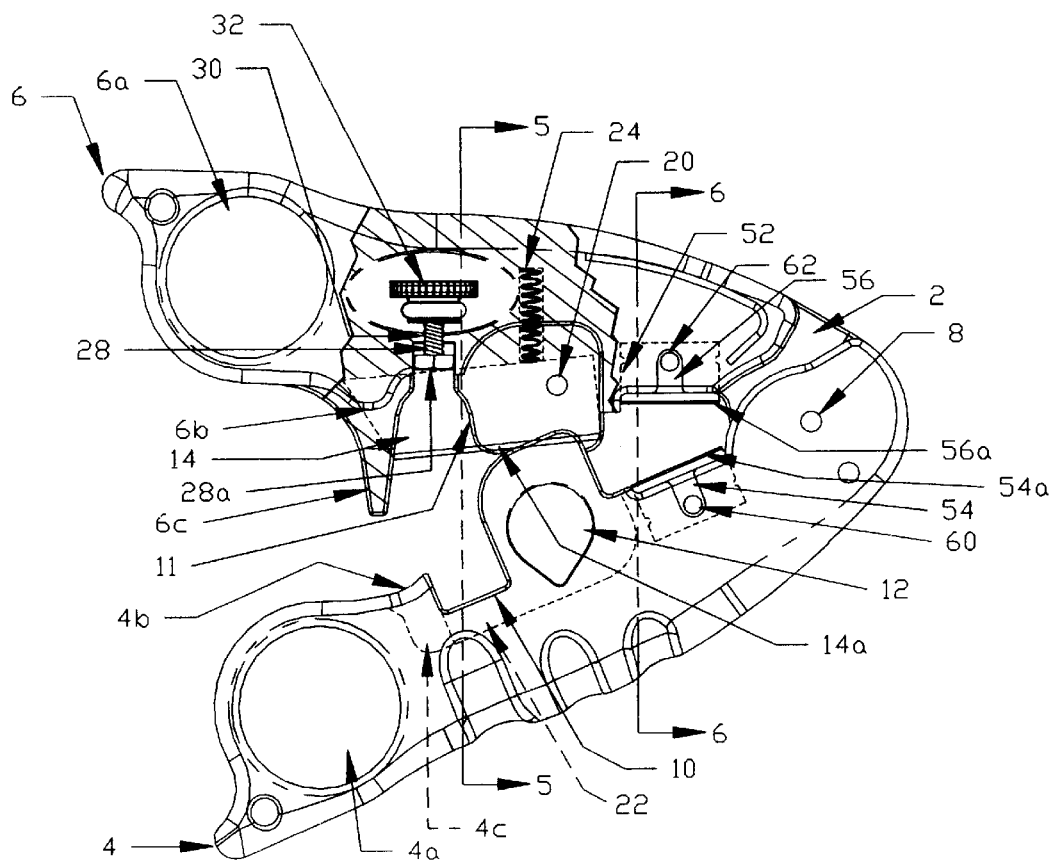
FIG. 1 is a partly sectioned side elevation view of the cutting and stripping tool of the present invention, the tool being illustrated in the open position.
FIG. 2 is a partly sectioned view of the tool of FIG. 1 when in the closed position.
Figure 3:
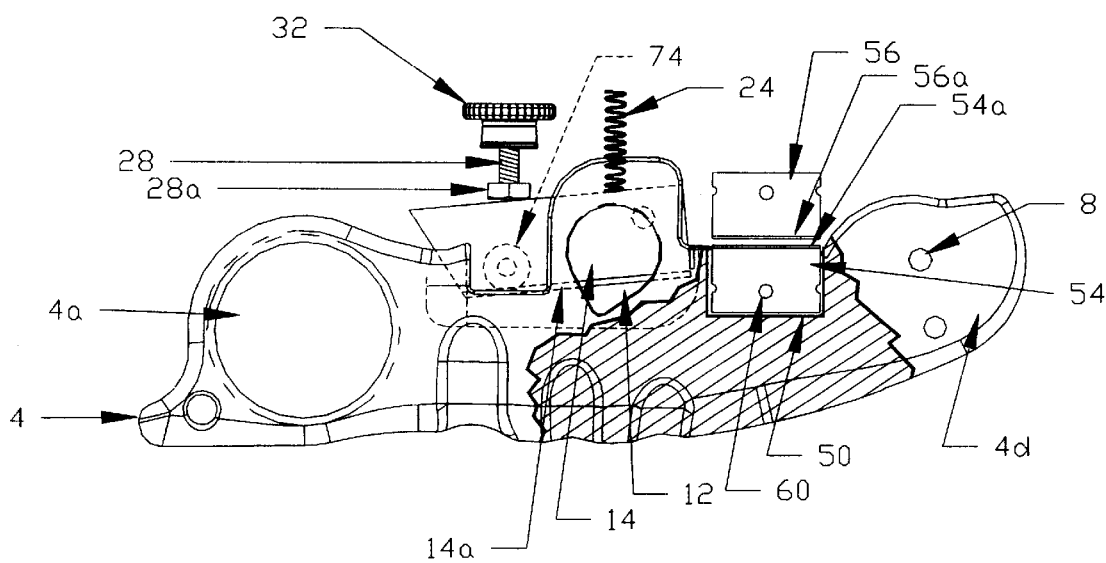
FIG. 3 is a side elevational view, with certain parts removed for clarity, illustrating the relationship between the lower handle member with the round-conductor cutting and stripping blade, and the pair of flat-cable stripping blades.

Referring first more particularly to FIG. 1, the hand-operated cutting and stripping tool 2 of the present invention includes a pair of handle members 4 and 6 having first ends that are pivotally connected by a pivot pin or rivet 8. The lower or first handle member 4 contains on the side thereof adjacent the second handle member 6 a cutting recess 10 that is adapted to receive an insulated cable or conductor 12 that is to be partially or completely severed. A corresponding second cutting recess 11 is contained in the second handle member opposite the first cutting recess. The first handle member 4 also contains adjacent the cutting recess 10 a round-cable through bore 12 that is adapted to receive a round cable or conductor having a tubular insulated outer layer or sheath that is to be scored and axially removed from the cable or conductor. The second or upper handle member 6 carries a cutting and stripping blade 14 having a cutting edge 14a the length of which equals the combined length of the cutting recess 10 and the maximum diameter of the round-cable through bore 12, whereby the single knife blade 14 can either fully or partially cut an insulated cable or conductor, or to score and axially remove the outer insulated layer of the cable or conductor. The cutting blade 14 is arranged in a longitudinally extending slot 18 that is contained in the lateral surface of the upper handle member 6 that is adjacent the lower handle member 4. The cutting and stripping blade 14. Which is preferably formed of stainless steel, is pivotally connected with the upper handle member 6 by pivot pin 20, as best shown in FIG. 5. The cutting edge 14a of the cutting and stripping blade 14 is adapted to extend within a corresponding longitudinal recess 22 contained in the adjacent lateral surface of the first or lower handle member 4. Compression spring 24 is arranged in a corresponding recess 25 contained in the upper member 6, which compression spring 24 is biases the blade 14 in the clockwise direction about pivot pin 20, as shown in FIG. 1. Variable-depth adjustment means are provided for pivoting the blade 14 in the counterclockwise direction about pivot pin 20, which adjustment means includes a screw 28 that extends within a corresponding bore 30 contained in the upper handle member 6. At its lower end, the screw 28 is provided with a flat terminal portion 28a that engages the blade 14, and at its upper end, the screw is threadably connected with and extends through a knurled knob 32 that is rotatably mounted within the upper hand member 6. Thus, rotation of the knurled knob 32 in one direction displaces screw 28 and flat portion 28a axially downwardly relative to the upper handle member 6, thereby to pivot the cutting and stripping blade 14 in the counterclockwise direction about pivot pin 20 against the resisting biasing force of compression spring 24. Rotation of knurled knob 32 in the opposite direction produces upward movement of the screw 28, whereby the cutting and stripping blade 14 is rotated by compression spring 24 in the clockwise direction about pivot pin 20.

The handle members 4 and 6 are provided at their second ends with finger or thumb-receiving openings 4a and 6a, respectively, said handle members being normally biased together toward the closed position of FIG. 2 by torsion spring means 40 (FIG. 4) having oppositely extending arm portions 40a and 40b that extend within corresponding channels 42 contained in the handle members 4 and 6, respectively. Retaining screw or rivet 44 maintains leg 40a of torsion spring 40 in place on the lower handle member 4. A pair of stop shoulders 4b and 6b cooperate to limit the extent to which the handle members 4 and 6 pivot toward each other when in the closed condition of FIG. 2. The handle members are guided and stabilized relative to each other by a guide tongue portion 6c of the upper handle member 6 that extends within a corresponding slot 6c, as best shown in FIG. 2.

In accordance with another important feature of the invention, the adjacent lateral portions of the lower and upper handle members contain precision recesses 50 and 52 for receiving a pair of flat cable stripping blades 54 and 56, respectively. The flat cable stripping blades 54 and 56 are retained in place by mounting screws or rivets 60 and 62 that are arranged adjacent access openings 64 and 66 provided in the side walls of the lower and upper handle members 4 and 6, respectively. The first end portion of lower handle member 4 is bifurcated to define a pair of arm portions 4d for receiving the corresponding tongue portion 6d of the upper handle member 6, as shown in FIG. 6.

The cutting and stripping blade 14 cooperates with the stripping through bore 12 to score and strip the outer insulation layer 70 from the conductor 72 of a round insulated conductor 74, as shown in FIG. 7. Similarly, as shown in FIG. 8, in the case of a rounded cable 76, the cutting and scoring blade 14 is operable to score and strip the outer insulation layer 78 from the braided shield layer 80 that surrounds the plurality of insulated conductors 82. In both the embodiments of FIGS. 7 and 8, the insulated conductor or cable has a round outer configuration. In the embodiment of FIG. 9, the conductor 86 is an insulated thin flat conductor having a layer of insulation 58 arranged about a plurality of insulated wires 90. In this case, the layer of insulation 88 is scored and stripped from the flat cable 86 by the flat stripping blades 54 and 56 that are carried by the handle members 4 and 6 intermediate the cutting and scoring blade 14 and the main pivot pin 8.

Operation

In operation, assuming that any of the round or flat insulated conductors or cables of FIGS. 7–9 are to be wholly or partially cut, the user—with one hand—opens the handle means to the FIG. 1 open condition, and the insulated conductor or cable is introduced into the cutting recess 10 contained in the lower handle member 4. This opening of the handle means was effected by the user inserting a finger in the finger opening 4a and a thumb within the thumb opening 6a, and then separating the handle members to the open position of FIG. 1 against the restoring biasing force of torsion spring 40. When the user squeezes the thumb and finger together to close the tool to the closed condition of FIG. 2, the cutting blade 14 cooperates with supporting cutting recess 10 to transversely sever the inserted insulated conductor or cable. This cutting effect may be a total cut or a partial cut as determined by the position of the cutting and stripping blade 14, as controlled by the adjustment screw 28.

In order to strip the layer of insulation 70 from the insulated conductor 74 or the layer of insulation 78 from the rounded cable 76, the insulated cable or conductor is inserted within the round stripping opening 12 when the handle members are pivoted toward their open position of FIG. 1. The position of the stripping and cutting blade 14 relative to the upper handle member 6 is adjusted as desired by rotation of the knurled knob 32, and corresponding axial displacement of the adjustment screw 28 and the enlarged end portion 28a. The handle members are then squeezed together toward the closed position of FIG. 2, whereupon the edge 14a of cutting and stripping blade 14 penetrates only the insulation layer 70 or 78, whereupon the tool is rotated about the round insulated conductor or cable, thereby to complete to circumferentially sever the outer insulated layer without penetrating the conductor or metal shield layer 80. The tool is then rotated completely around the insulated cable or conductor, and then is displaced axially relative to the conductor or cable, thereby to strip the severed insulation section therefrom. The stripped conductor or cable is then axially withdrawn from the round stripping opening 12.

Figure 4:
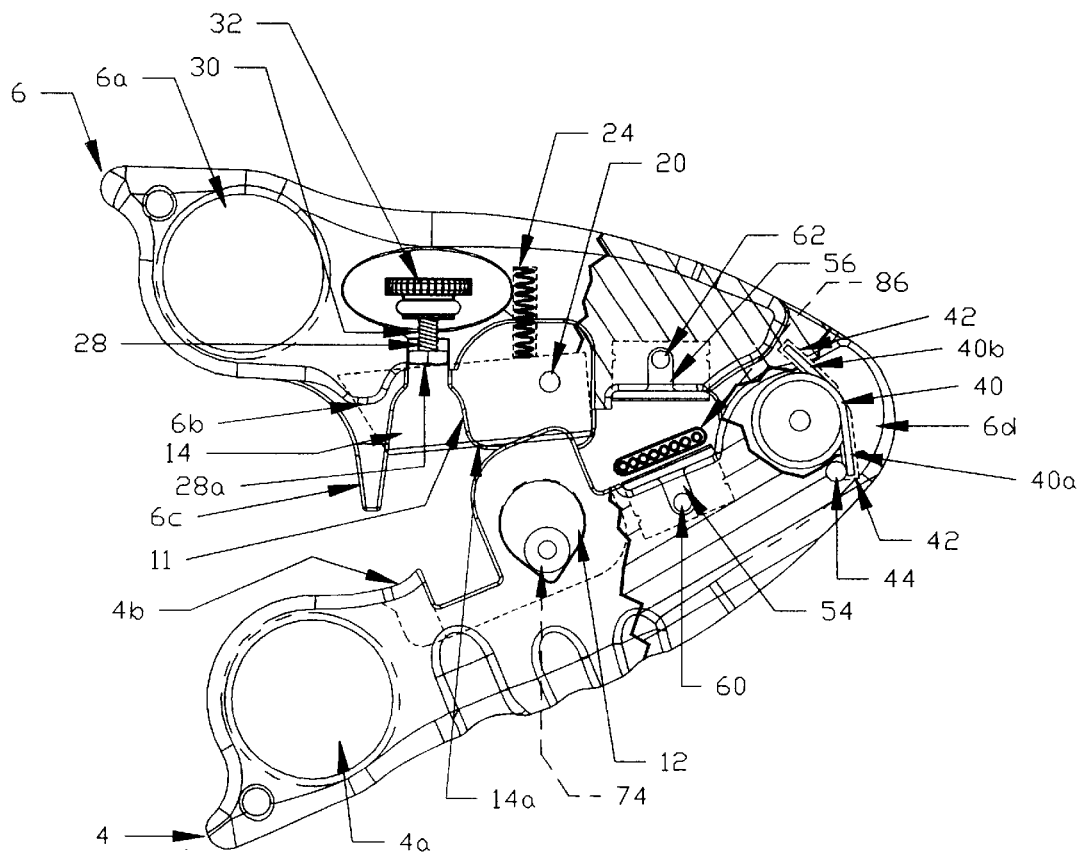
FIG. 4 is a partly sectioned side elevation view illustrating the tool when displaced to its open position against the restoring force of a torsion biasing spring.

In order to strip the outer insulation layer from the flat satin insulated cable 86, the handles are placed in the open position of FIGS. 1 and 4, and the flat insulated cable 86 is introduced within the stripping opening defined between the parallel flat stripping blades 54 and 56. The handle members are then pivoted to the closed position, whereupon the cutting edges 54*a* and 56*a* of the flat cutting blades 54 and 56 score only the layer of insulation 88 surrounding the insulated conductors 90. The tool is then axially displaced relative to the flat cable, whereby the severed insulation section is removed from the cable.

In general, the handle members 4 and 6 are formed from a suitable synthetic plastic material, such as nylon reinforced synthetic plastic. The stripping blades 14, 54 and 56 are preferably formed from stainless steel for long life, corrosion resistance, and long-term sharpness.

While in accordance with the provisions of the Patent Statutes the preferred forms and embodiments of the invention have been illustrated and described, it will be apparent to those skilled in the art that various changes may be made without deviating from the inventive concepts set forth above.

What is claimed is:

1. A hand-operated scissors-type tool for cutting and stripping round and thin flat insulated conductors and cables, comprising:
   (a) handle means including first and second handle members having first and second ends, and a first pivot pin pivotally connecting together said first ends, said second ends containing thumb and finger openings, respectively, said handle members being pivotally operable between closed and open conditions, respectively, said handle members having lateral side portions that are adjacent each other, respectively;
   (b) first spring means biasing said handle members toward said closed condition;
   (c) a pair of flat cable stripping blades;
   (d) means connecting said flat cable stripping blades with the adjacent lateral side portions of said handle members adjacent said first pivot pin, said flat cable stripping blades having cutting edges that are parallel and spaced when said handle means is in said closed condition;
   (e) said lateral portion of said first handle member containing:
      (1) a first cutting recess for receiving an insulated conductor that is to be cut; and
      (2) a round cable stripping through bore adjacent said cutting recess, said stripping through bore being operable to receive a round insulated layer conductor from which a portion of its insulation is to be axially removed;
   (f) a cutting and stripping blade having a cutting edge; and
   (g) variable depth adjustment means adjustably connecting said cutting and stripping blade with said lateral portion of said second handle member, said cutting and stripping blade extending longitudinally of said second handle member, said cutting edge of said cutting and stripping blade being arranged adjacent and extending substantially completely across both said first cutting recess and said stripping through bore, said adjustment means being operable to adjust the position of said cutting edge of said cutting and stripping blade generally transversely relative to said second handle member;
   (h) the configuration of said first cutting recess being such that when said handle members are in said closed condition, the insulated conductor introduced within said first cutting recess is cut at least partially thereacross;
   (i) the configuration of said stripping through bore being such that when said handle members are in said closed condition, initial rotation of said tool about the insulated conductor inserted into said stripping through bore causes severing of the insulation layer by said cutting edge of said cutting and stripping blade, and subsequent axial displacement of said tool relative to said introduced insulated conductor effects axial removal of the severed insulation layer from the conductor.

2. A cutting and stripping tool as defined in claim 1, wherein said adjacent lateral portions of said handle members contain second recesses for receiving said flat cable stripping blades, respectively, and means for fastening said flat cable stripping blades in their respective recesses.

3. A cutting and stripping tool as defined in claim 2, wherein said handle members include adjacent stop surfaces that cooperate to limit the extent of movement of the handle members toward each other when in said closed condition, thereby to define a gap between said flat cable stripping blades.

4. A cutting and stripping tool as defined in claim 1, wherein said round cable stripping bore is arranged between said first cutting recess and said pivot pin.

5. A cutting and stripping fool as defined in claim 4, wherein said adjacent lateral portion of said second handle member contains a second cutting recess opposite said first cutting recess, said second handle member also containing a first longitudinal slot communicating with said second cutting recess, said cutting and stripping blade being arranged for movement in said slot and said second cutting recess.

6. A cutting and stripping tool as defined in claim 5, wherein said cutting and stripping blade is generally rectangular and has first and second ends adjacent and remote from said pivot pin, respectively; and further including a second pivot pin connecting said cutting and stripping blade for pivotal movement relative to said second handle member about an axis parallel with said first pivot pin.

7. A cutting and stripping tool as defined in claim 6, and further wherein said variable-depth adjustment means includes:
   (a) an adjustment screw threadably connected with a threaded bore contained in said second handle member normal to and communicating with said second cutting recess, said adjustment screw having a first end adjacent said cutting and stripping blade, and a second end remote from said first end; and
   (b) a knurled knob connected with said adjustment screw second end for rotating said adjustment screw to pivot said cutting and stripping blade in one direction about said second pivot pin, thereby to control the depth to which said cutting edge of said cutting and stripping blade extends within said stripping through bore when said handle means is in said closed condition; and
   (c) second spring means biasing said cutting and stripping blade in the opposite direction about said second pivot pin.

* * * * *